: US 7,596,804 B2
(45) Date of Patent: Sep. 29, 2009

(12) United States Patent
Toomey et al.

(54) SEAMLESS CROSS-SITE USER AUTHENTICATION STATUS DETECTION AND AUTOMATIC LOGIN

(75) Inventors: Christopher Newell Toomey, Cupertino, CA (US); Conor Cahill, Dulles, VA (US)

(73) Assignee: AOL LLC, Dulles, VA (US)

( * ) Notice: Subject to any disclaimer, the term of this patent is extended or adjusted under 35 U.S.C. 154(b) by 730 days.

(21) Appl. No.: 10/519,774
(22) PCT Filed: Jul. 2, 2003
(86) PCT No.: PCT/US03/21244

§ 371 (c)(1),
(2), (4) Date: Dec. 22, 2004

(87) PCT Pub. No.: WO2004/006499

PCT Pub. Date: Jan. 15, 2004

(65) Prior Publication Data
US 2005/0216582 A1    Sep. 29, 2005

Related U.S. Application Data

(60) Provisional application No. 60/393,658, filed on Jul. 2, 2002.

(51) Int. Cl.
H04L 9/00    (2006.01)
(52) U.S. Cl. ............................ 726/5; 707/200; 709/213
(58) Field of Classification Search ................ 726/1–8, 726/17–21, 27–30; 713/150, 155, 182–186, 713/188–189, 159, 170; 709/203, 223–225, 709/212–219, 228–229; 711/5, 100–105, 711/111–112, 128, 154; 707/1–3, 8, 10, 707/100, 103 R–103 Z, 200–205; 705/67, 705/75–79, 18, 21, 26, 42–44, 404–405
See application file for complete search history.

(56) References Cited
U.S. PATENT DOCUMENTS 5,343,529 A    8/1994    Goldfine et al. ............... 380/23
6,049,877 A    4/2000    White ........................ 713/201
6,092,196 A    7/2000    Reiche ....................... 713/200
6,182,142 B1    1/2001    Win et al. .................... 709/229

(Continued)

FOREIGN PATENT DOCUMENTS

| EP | 940 960 | 9/1999 |
| EP | 1 089 516 | 4/2001 |
| EP | 1 126 663 | 8/2001 |
| WO | WO 01/01280 | 1/2001 |
| WO | WO 02/17181 | 2/2002 |

OTHER PUBLICATIONS

*Internet Security Association and Key Management Protocol (ISAKMP)*; Douglas Maughan, and Mark Schertler; IPSEC Working Group; Feb. 21, 1996.

(Continued)

*Primary Examiner*—Kimyen Vu
*Assistant Examiner*—Leynna T Truvan
(74) *Attorney, Agent, or Firm*—Knobbe Martens Olson & Bear LLP

(57) ABSTRACT

A system and method for determining in a global network the user network authentication status as the user goes from site to site within the network is provided. Additionally, the system and method provides for transparent or implicit multi-site logon functionality, including automatic introduction from one site to the other using a baseline authentication agency (102). The system and method provides an architecture for a core global network (100) (referred to herein as NET) that incorporates some or all of the following features and components: a set of baseline authentication agencies responsible for the core global network (NET) services, such as login and user-selected service-provider lookup; a shared NET domain and associated DNS records (106) used for cookie (110) sharing, login routing, and the like; and a collection of partner sites (108) accessible via the NET.

16 Claims, 4 Drawing Sheets

U.S. PATENT DOCUMENTS

| | | | |
|---|---|---|---|
| 6,199,113 B1 | 3/2001 | Alegre et al. | 709/229 |
| 6,225,995 B1 | 5/2001 | Jacobs et al. | 345/335 |
| 6,226,752 B1 | 5/2001 | Gupta et al. | 713/201 |
| 6,252,952 B1 | 6/2001 | Kung et al. | 379/114 |
| 6,256,739 B1 | 7/2001 | Skopp et al. | 713/201 |
| 6,275,934 B1 | 8/2001 | Novicov et al. | 713/168 |
| 6,324,648 B1 | 11/2001 | Grantges, Jr. | 713/201 |
| 6,334,114 B1 | 12/2001 | Jacobs et al. | 705/26 |
| 6,345,288 B1 | 2/2002 | Reed et al. | 709/201 |
| 6,345,303 B1 | 2/2002 | Knauerhase et al. | 709/238 |
| 6,351,812 B1 | 2/2002 | Datar et al. | 713/182 |
| 6,377,548 B1 | 4/2002 | Chuah | 370/233 |
| 6,378,075 B1 | 4/2002 | Goldstein et al. | 713/200 |
| 6,381,644 B2 | 4/2002 | Munguia et al. | 709/225 |
| 6,421,768 B1 | 7/2002 | Purpura | 711/164 |
| 6,904,449 B1 * | 6/2005 | Quinones | 709/203 |
| 6,950,522 B1 * | 9/2005 | Mitchell et al. | 380/280 |
| 6,957,334 B1 * | 10/2005 | Goldstein et al. | 713/170 |
| 6,985,953 B1 * | 1/2006 | Sandhu et al. | 709/229 |
| 6,986,040 B1 * | 1/2006 | Kramer et al. | 713/155 |
| 6,993,596 B2 * | 1/2006 | Hinton et al. | 709/250 |
| 7,162,436 B1 * | 1/2007 | Eckel, Jr. | 705/26 |
| 7,293,093 B2 * | 11/2007 | Leighton et al. | 709/226 |
| 7,330,971 B1 * | 2/2008 | Kukreja et al. | 713/168 |
| 7,356,838 B2 * | 4/2008 | Madison et al. | 726/10 |
| 2003/0023880 A1 | 1/2003 | Edwards et al. | 713/201 |
| 2003/0105862 A1 | 6/2003 | Villavicencio | 709/225 |

OTHER PUBLICATIONS

*Kerberos: Authentication Service for Open Network Systems*; Jennifer Steiner, Clifford Neuman, and Jeffrey I. Schiller; Mar. 30, 1988.

*The Role of Trust Management in Distributed Systems Security*; Matt Blaze, Joan Feigenbaum, John Ioannidis, and Angelos D. Keromytis.

*Decentralized Trust Management*; Matt Blaze, Joan Feigenbaum, and Jack Lacy.

*VeriNet Web-Speaker Verification for the World Wide Web*; K. Farrell, and W. Mistretta; Proceedings of International Conference on Multimedia and Expo; Jul. 30-Aug. 2, 2000.

*A Survey on IPSEC Key Management Protocols*; Jong-Hyeon Lee.

*Kerberos Authentication and Authorization System*; S.P. Miller, B.C. Neuman, J.I. Schiller, and J.H. Saltzer; Kerberos Authentication and Authorization System; Oct. 27, 1988.

International Search Report for PCT Application Serial No. PCT/US03/21244.

International Preliminary Examination Report for PCT Application Serial No. PCT/US03/21244.

* cited by examiner

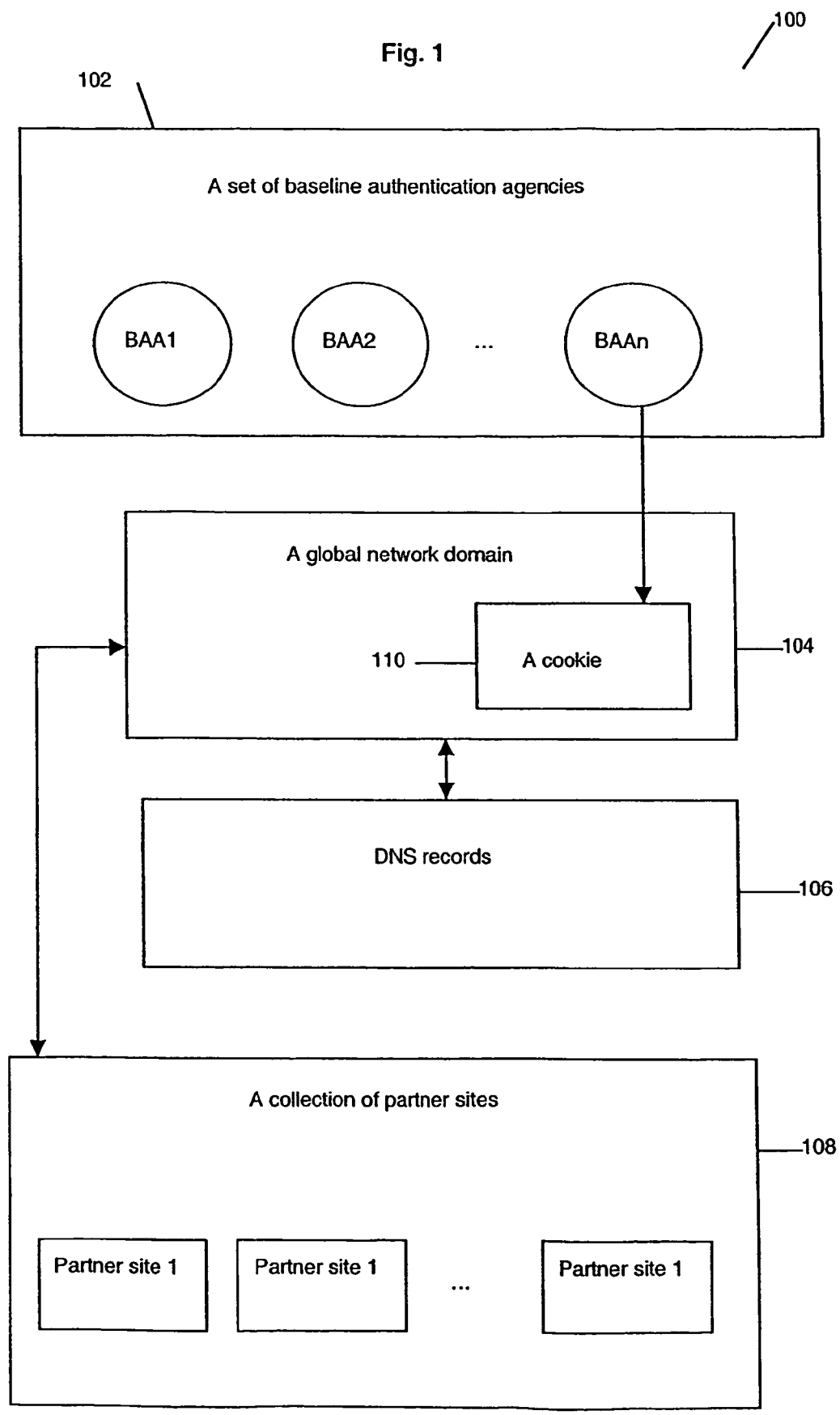

SEAMLESS CROSS-SITE USER AUTHENTICATION STATUS DETECTION AND AUTOMATIC LOGIN

RELATED APPLICATIONS

This application is the U.S. National Phase under 35 U.S.C. § 371 of International Application No. PCT/US03/21244, filed Jul. 2, 2003, which claims priority to U.S. Provisional Application No. 60/393,658, filed Jul. 2, 2002.

BACKGROUND OF THE INVENTION

1. Technical Field

The invention relates generally to online user network authentication status detection. More particularly, the invention relates to a system and method for determining in a global network the user network authentication status as the user goes from site to site, and providing a transparent/implicit multi-site logon including automatic introduction from one site to the other.

2. Description of the Prior Art

In the world of computer networks and computer network systems, for executing applications on a computer, the application often requires users to authenticate themselves prior to performing any actions to prevent unauthorized access. Typically, a user provides identification by a user name and password combination, and may have to supply other information such that the user can create and later access a private account on a merchant's site.

Prior art mechanisms for cross-network single sign-on, such as Microsoft Passport (www.passport.com) and AOL Screen Name Service (my.screenname.aol.com), require partner sites in the network to direct the user's browser to the central authentication Web site in order to obtain the user's network authentication status. In a global network including partner sites and non-partner sites, it would be advantageous to provide a secure and efficient apparatus and process for partner sites to automatically and independently determine if a user has signed into the global network without the user's browser having to interact with the central authentication site.

SUMMARY OF THE INVENTION

A system and method for determining in a global network the user status as the user goes from site to site within the network is provided. Additionally, the system and method provides for transparent or implicit multi-site logon functionality, including automatic introduction from one site to the other using a baseline authentication agency. The system and method provides an architecture for a core global network (referred to herein as NET) that incorporates some or all of the following features and components: a set of baseline authentication agencies responsible for the core global network (NET) services, such as login and user-selected service-provider lookup; a NET and associated DNS records used for cookie sharing, login routing, and the like; and a collection of partner sites accessible via the NET.

In the preferred embodiment of the invention, the baseline authentication agency (referred to herein as BM) manages a subset of the NET user namespace and provides core NET services such as authentication for NET users. The baseline authentication agency supports authentication of NET id's via corresponding passwords or other authentication credentials. After authenticating a user, the baseline authentication agency writes its BAA identification (BAA id) along with an authenticated status of true into a cookie that it sets in a shared domain that can be accessed by NET partner sites.

When an authenticated NET user visits a NET partner site, the NET partner site accesses the shared domain cookie to determine the user's network authentication status and baseline authentication agency. If the user is already authenticated into the network, the NET partner site may then redirect the user's browser to the authentication agency's Web site to request NET id information for the user. The baseline authentication agency distinguishes between sites that have been linked and that have a trust relationship with the user and ones that have not been linked. The baseline authentication agency returns the user's NET id information to the partner site if it's a linked site, thereby performing a seamless authentication. If the site is not linked, the baseline authentication agency returns an authentication error indication.

When a NET user logs out of NET, the user's baseline authentication agency resets the user's authenticated status to false in the shared domain cookie.

When an unauthenticated NET user visits a 'NET partner site, the NET partner site attempts to access the shared domain cookie and either does not find the cookie at all, or sees that the authenticated status is false. In either case, the NET partner site sees that the user is not authenticated into NET and thus does not allow access.

BRIEF DESCRIPTION OF THE DRAWINGS

FIG. 1 is a schematic diagram of the components and their respective relationships of an architecture for a core global network for detecting user status according to the invention;

DETAILED DESCRIPTION OF THE INVENTION

Figure 2A:
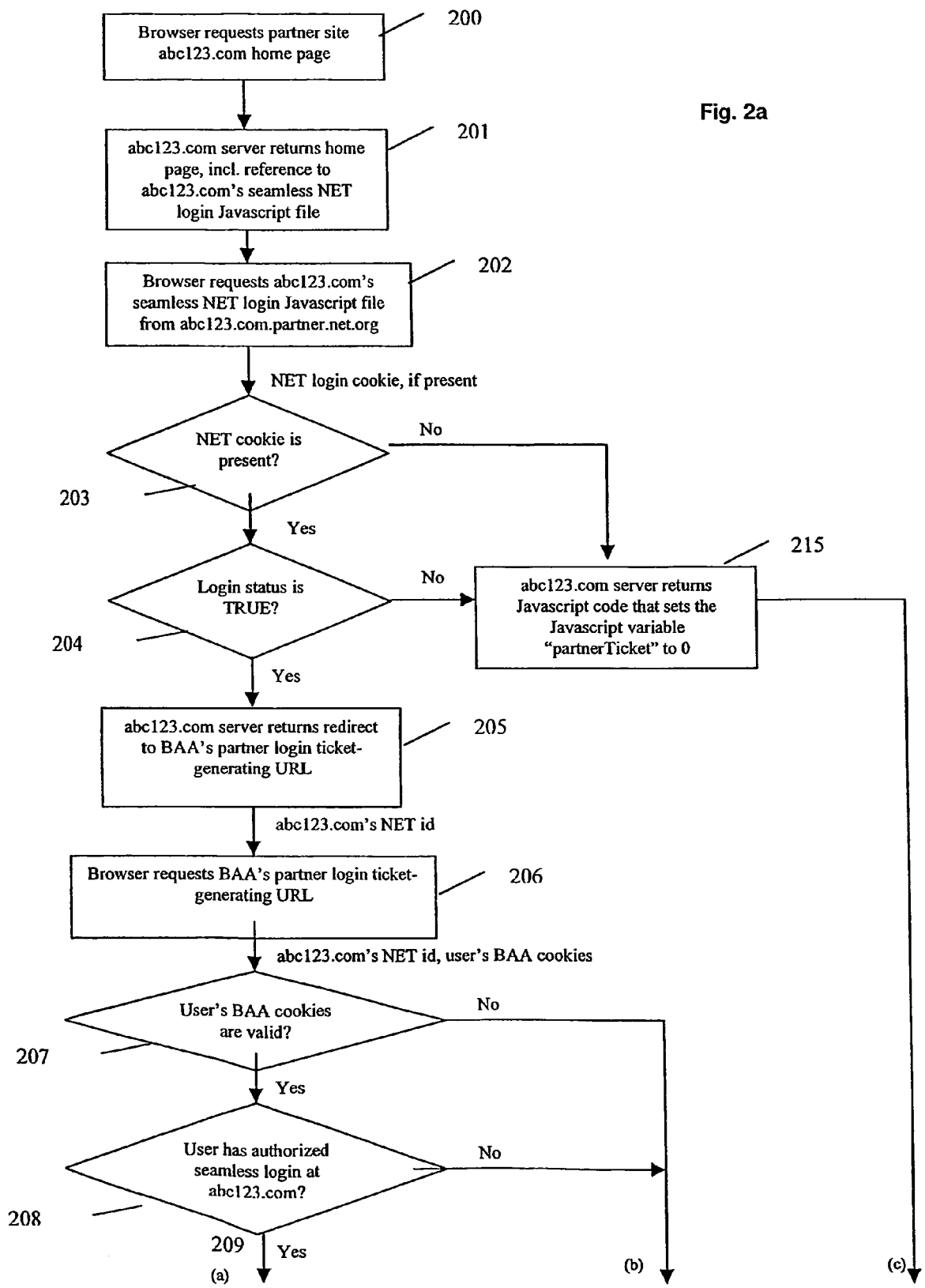
FIG. 2*a* is a flow diagram of a realized NET partner site seamless user authentication detection and automatic login according to the invention.

A system and method for determining in a global network the user status as the user goes from site to site within the network is provided, and can be described with reference to FIG. 1. Additionally, the system and method provides for transparent or implicit multi-site logon functionality, including automatic introduction from one site to the other using a baseline authentication agency. The system and method provides an architecture for a core global network 100 (referred to herein as NET) that incorporates some or all of the following features and components: a set of baseline authentication agencies 102 responsible for the core global network (NET) services, such as login and user-selected service-provider lookup; a NET domain 104 and associated DNS records 106 used for cookie sharing, login routing, and the like; and a collection of partner sites 108 accessible via the 104 NET domain.

In the preferred embodiment of the invention, the baseline authentication agency 102 (referred to herein as BAA) manages a subset of the NET user namespace and provides core NET services for NET users. The baseline authentication agency 102 supports authentication of NET id's via corresponding passwords or other authentication credentials. After authenticating the credentials, the baseline authentication agency 102 writes its BAA identification (BAA id) along with an authenticated status of true into a cookie 110 of the shared domain 104 that is accessed by NET partner sites 108. It should be appreciated that both partner sites and BAAs have unique NET identifiers. For example, such identifiers can be referred to uniformly as "NET ids", or as "partner NET ids" and "BAA NET ids", respectively.

When an authenticated NET user visits a NET partner site 108, the NET partner site 108 accesses the shared domain cookie 110 to determine the user's baseline authentication agency 102. The NET partner site 108 then redirects the user's browser to the authentication agency's Web site 102 to request NET.id information for the user. The baseline authentication agency 102 distinguishes between sites that have been linked and that have a trust relationship with the user and ones that have not been linked. The baseline authentication agency 102 returns the users NET id information to the partner site 108 if it's a linked site, thereby performing a seamless authentication. If the site is not linked, the baseline authentication agency 102 returns an authentication error indication.

When a NET user logs out of NET, the user's baseline authentication agency 102 resets the user's authenticated status to false in the shared domain cookie 110.

When an unauthenticated NET user visits a NET partner site 108, the NET partner site 108 attempts to access the shared domain cookie 110 and either does not find the cookie at all, or sees that the authenticated status is false. In either case, the NET partner site 108 sees that the user is not authenticated into NET and thus does not allow access.

Design Goals

In this section is a discussion of some of the design goals considered for the preferred embodiment of the invention.

The preferred embodiment of the invention provides an architecture for a system that is sufficiently decentralized to enable a global network (also referred to herein as NET) to assemble a strong partnership of large namespace-owning companies, or baseline authentication agencies (BAAs).

The preferred embodiment of the invention provides means for minimizing barriers to adoption, and routine use of NET's services, by:
  existing users of NET's membership company products;
  enabling a seamless membership of interoperable authentication agencies and their associated user bases;
  users without existing NET partnership company ties; and
  potential global network affiliates, such as companies operating Web sites and Web services.

The preferred embodiment of the invention provides means for providing user flexibility in privacy controls.

Strategy and Key Concepts

The preferred embodiment of the invention provides the following architectural strategy for achieving the above goals by using the following elements, each element discussed in a section by the same name herein below: NET Accounts and GUIDs, Baseline Authentication Agencies, and Decentralization of Core NET Functionality NET Accounts and GUIDs The strategy for addressing the "frictionless service portability" goal, which also provides privacy of the NET login ids (communication addresses), provides a globally unique identifier (GUID) for each NET user account. Such id is essentially a global network account number that will be largely or fully unknown to a user.

It should be appreciated that a GUID may have more than one associated global network login id.

Also, this GUID, and not the user NET LID, is the primary key with which the global network user data records are indexed. With such approach, users are free to change their respective NET LIDs. For example, a user can switch from a first ISP's email LID to a second ISP's LID for authentication and communication services (foo@baa1.com-> foo@baa2.com) without losing their respective global network account and everything associated with it throughout the global network.

For privacy reasons, only the GUID and the name of the authenticating agency are shared with third party sites unless the user opts-in to distributing the global network LID. In general, unless a user has established a trust relationship or linkage with a third party site, not even the GUID is made available to the site.

Decentralization of Core Global Network (NET) Functionality

It is undesirable to a candidate global network BAA for the global network architecture to have a significant centralization of authentication, wherein global network servers operated by other global network BAAs would have to be depended on and/or are able to track logins to a given global network BAA, such as the candidate global network BAA.

It is also undesirable to a candidate partner site for the global network to depend on interaction with a global network server to determine the network authentication status of users who visit the candidate site. Hence a decentralization requirement imposed on the architecture is to enable partner sites in the network to autonomously determine the network authentication status of users who visit, without having to direct users to a global network server in order to accomplish this.

The design strategy for addressing such requirements according to the preferred embodiment of the invention is as follows:
  Propagate selected global network user information to global network partner sites by setting cookies on a global network domain, e.g. partners.net.org, for which each partner has an entry, e.g. books.com.partners.net.org, such that partners can fetch such data without hitting any centralized global network server, e.g. a server operated by one of the BAAs.
  Store baseline global network user account data at the user's owning BAA, vs. at a central global network location.

Architecture Components

The global network architecture includes the following components:
  A set of baseline authentication agencies (BAAs) that are responsible for core global network services, such as user authentication and user-selected service-provider lookup.
  A global network domain, e.g. net.org, and associated DNS records for use in cookie sharing, login routing, etc.
  A collection of partner sites, also known as consumer services, accessible via the global network.

These components of the global network architecture are further described in detail herein below Baseline Authentication Agencies (BAAs)

In the preferred embodiment of the invention, BAAs are the backbone of the global network. They collectively manage the global network namespace and provide core global network services, such as basic login, account maintenance, service subscription management and lookup, etc. for global network users. Following is an example of a BAA's responsibilities.

The baseline authentication agency supports authentication of global network ids via corresponding passwords or other authentication credentials. After authenticating the user, the BAA creates and signs authentication credentials for a given user, and deposits such credentials in a centralized domain.

Underlying data: The BAA has, at a minimum, one record per-global network id, the record containing a) the global network login id (NET LID); b) a corresponding global network GUID; c) privacy option regarding sharing global network login id with a linked site, such as a partner site; and d) information sufficient to authenticate the user, e.g. a hashed copy of the user's password.

The BAA needs to be able to distinguish between a partner site that has been linked, i.e. established a trust relationship with the user, and one that has not yet been linked. For linked sites, the global network id information for a logged in user is implicitly shared as the user visits or surfs to the partner site. For an unlinked site, the user is anonymous relative to the global network when visiting the site.

Underlying data: on a per global network id basis, the BAA maintains a list of all partner sites that have been linked by the user to the global network id.

Global Network Domain

In the preferred embodiment of the invention, the global network owns and operates an Internet domain, i.e. the NET domain, such as net.org. This NET domain is used as the destination domain for cookies that need to be shared among global network BAAs and/or shared among global network partner sites. The login model herein discussed calls for a cookie to be made available to all global network partners by being set on the NET domain or a subdomain thereof, e.g. partners.net.org, and giving each partner a DNS entry on a subdomain thereof, e.g. aol.com.partners.net.org.

The NET domain is also used to facilitate routing of login credential submissions to the proper BAA for the user, as described in U.S. patent application Ser. No. 10/086,104, filed Feb. 26, 2002.

Example Implementation

Figure 2B:
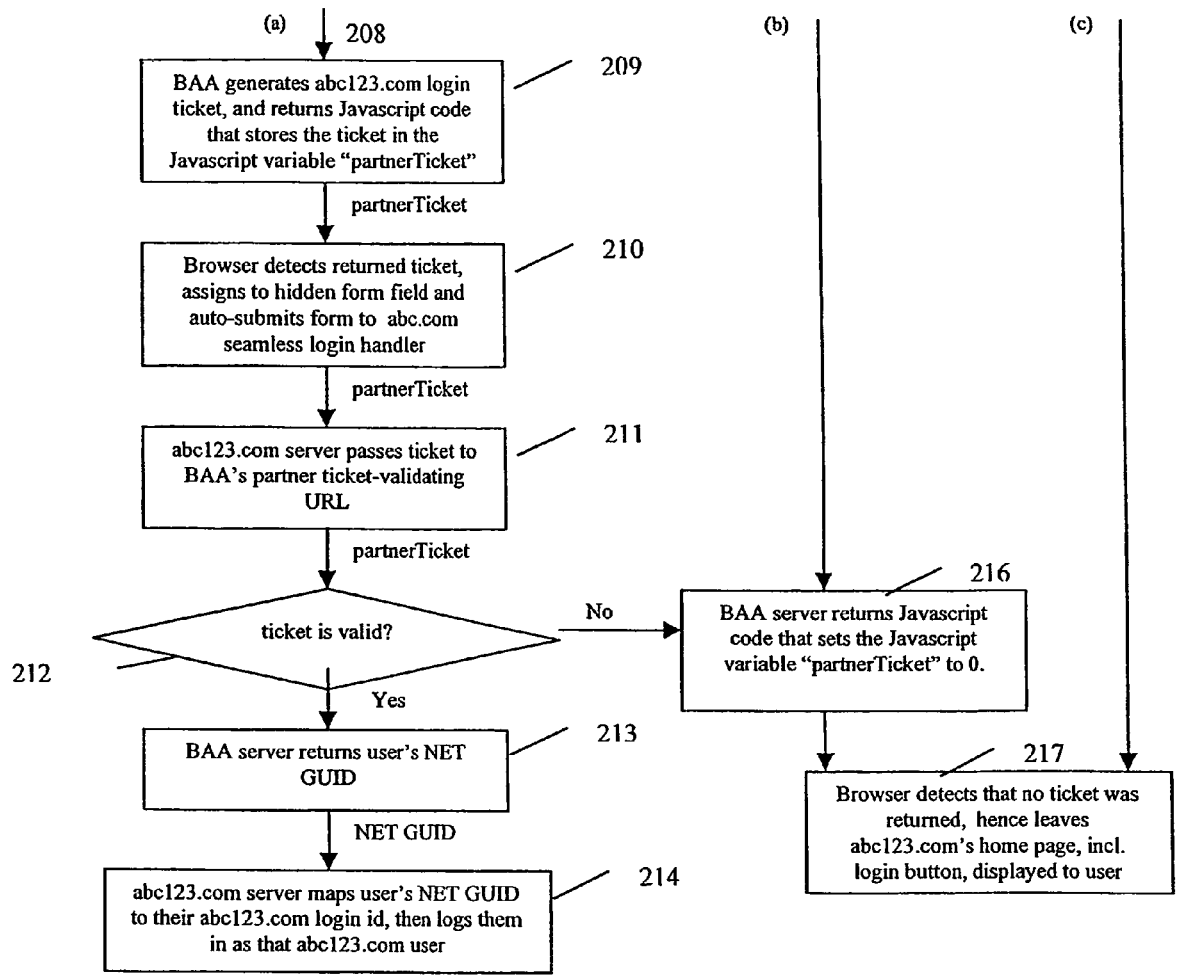
FIG. 2*b* is a flow diagram of a realized NET partner site seamless user authentication detection and automatic login according to the invention.

This section describes in detail an example implementation according to the preferred embodiment of the invention. It should be appreciated that the particular implementation is by example only, and that other implementations are possible and within the spirit and scope of the invention. The sample implementation can be described with reference to FIGS. 2a and 2b, a flow diagram of a realized NET partner site seamless user authentication detection and automatic login.

Step 1. User navigates to NET partner site abc123.com's home page, which the user's browser requests (200).

Step 2. abc123.com's server returns abc123.com's home page, which contains an JavaScript tag that instructs the browser to fetch abc123.com's seamless NET login JavaScript page from abc123.com's subdomain on the shared NET domain and to subsequently detect and process auto-generated login ticket returned by user's BAA. (201)

Step. 3 Browser requests abc123.com's seamless NET login JavaScript page, and passes along the user's shared NET login cookie, if any. (202)

Step 4. abc123.com's server examines the browser request to see if a NET login cookie is available. (203)

Step 5. abc123.com's server examines the user's NET login cookie to see if the user's login status is "true", i.e., the user is currently logged in.(204)

Step 6. abc123.com server returns an HTTP redirect to the ticket-generating URL configured for the user's BAA, as indicated in the NET login cookie. (205)

Step 7. Browser follows redirect and requests BAA's ticket-generating URL, passing along abc123.com's NET id and user's BAA login cookies. (206)

Step 8. BAA's server inspects users BAA login cookies to ensure they're valid, e.g., by checking their timestamp, checksum values, etc. (207)

Step 9. BAA's server checks its database records to see if user has previously authorized seamless login to abc123.com. (208)

Step 10. BAA generates abc123.com login ticket for user and returns JavaScript code containing the ticket. (209)

Step 11. JavaScript code returned to browser in step 201 detects the login ticket, assigns the ticket value to a hidden form field in abc123.com's home page, and auto-submits the form to continue the seamless login. (210)

Step 12. abc123.com server receives the ticket from the browser and issues a server-to-server request to BAA's ticket-validating URL. (211)

Step 13. BAA server validates the ticket, e.g., by checking its embedded timestamp, checksum values, etc. (212)

Step 14. BAA server returns the user's NET GUID. (213)

Step 15. abc123.com server receives the user's NET GUID and looks it up in its database to find the user's corresponding abc123.com user id, then logs the user in as that abc123.com user id. (214)

Step 16. abc123.com server returns JavaScript in which the partner ticket variable is set to "0" to indicate that no ticket is available. (215)

Step 17. BAA server returns JavaScript in which the partner ticket variable is set to "0" to indicate that no ticket is available. (216)

Step 18. Browser detects that no partner ticket has been returned, hence aborts the seamless NET login processing and leaves abc123.com's home page (returned in step 201) displayed to the user. (217)

The example partner site implementation consists of the following files, the contents of which are listed below.

abcHomePage.htm—an example partner site home page that implements seamless user status detection and auto-login.

statusDetect.jsp—an example partner site dynamic server page, written in JavaServerPages syntax, that detects and acts upon user's login status based on NET login status cookie.

Table A below shows an example html file for the home page of the partner site according to the invention.

TABLE A abcHomePage.htm:

```
1  <html>
2  <head>
3  <title>abc123.com home page</title>
4
5  <script>
6  var partnerTicket=0;
7  // Function to be invoked after page, incl. embedded JavaScript file, loads
8  function onLoad( ) {
9    // Got ticket?
10   if (partnerTicket != 0) {
11     // Yes -- auto-submit to abc123.com's seamless login handler
```

TABLE A-continued abcHomePage.htm:

```
12      document.forms.autologin.ticket.value = partnerTicket;
13      document.forms.autologin.submit( );
14     }
15 }
16 </script>
17 </head>
18
19 <body onLoad="onLoad( ); return false;">
20 Welcome to abc123.com!
21
22 <p>Guest, please <a href="loginForm.jsp">login</a>
23
24 <script src="http://abc123.com.partner.net.org/
    statusDetect.jsp"></script>
25
26 <form name="autologin" action="autoLogin.htm">
27 <input type="hidden" name="ticket" value="0">
28 </form>
29
30 </body>
31
32 </html>
```

Table B below shows an example JavaScript program segment for detecting a user's status according to the invention.

TABLE B statusDetect.jsp:

```
1  <%@ page language="java"
2         import="java.net.*,java.io.*,java.util.*,javax.servlet.http.*"
3  %>
4
5  <%
6  // Find netLoginStatus cookie value, if any
7  Cookie cookies[] = request.getCookies( );
8  boolean found = false;
9  String status = null;
10 String baaId = null;
11
12 for (int i=0; (i<cookies.length) && !found; i++) {
13    found = cookies[i].getName( ).equals("netLoginStatus");
14    if (found) {
15       // Value is of form <status>-<BAAId>
16       String val = cookies[i].getValue( );
17       int sepPos = val.indexOf ("-");
18       status = val.substring(0, sepPos);
19       baaId = val.substring(sepPos+1);
20    }
21 }
22
23 // Found cookie and user logged in?
24 if (found && status.equals("true")) {
25    // Yes
26
27    // Lookup BAA's ticket-generating URL
28    String baaUrl = "";
29    if (baaId.equals("baa1")) {
30
31       baaUrl = "http: //login.baa1.partner.net.org/
          ticketGen?siteId=abc123.com";
32    } else if (baaId.equals("baa2")) {
33       baaUrl = "http: //auth.baa2.partner.net.org/
          tg?siteId=abc123.com";
34    } // ...
35
36    // Redirect to BAA's ticket-generating URL
37    response.sendRedirect(baaUrl);
38 } else {
39    // No -- render login button
40    out.println("<a href=\"loginForm.jsp\">Login</a>");
41 }
```

Seamless Login Example

Figure 3:
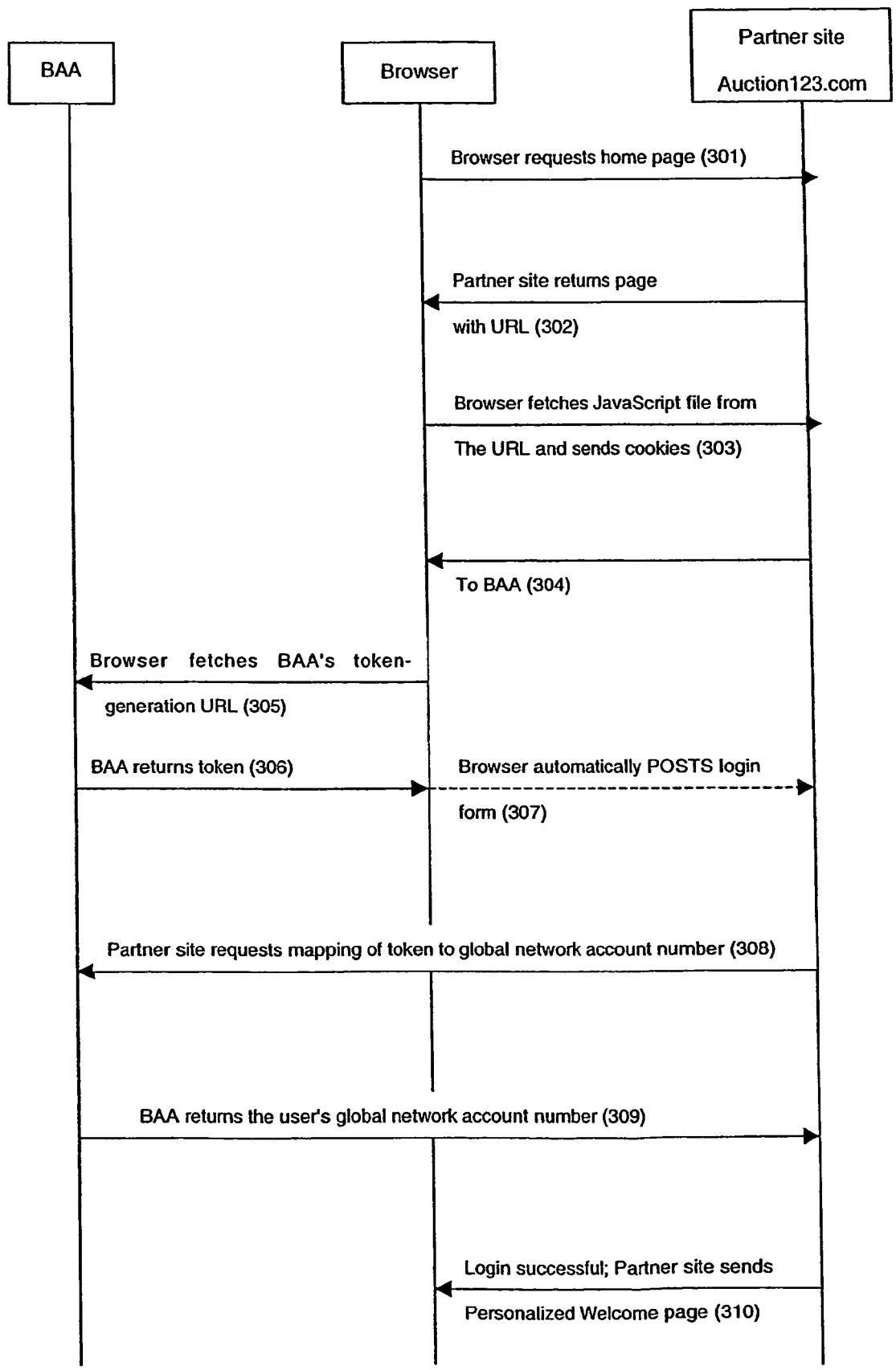
FIG. 3 is global network architecture component interaction diagram according to the invention.

This section illustrates interactions when the user visits a global network partner site after previously logging into the global network during the same session, and can be described with reference to FIG. 3, a global network architecture component interaction diagram.

The following steps are meant by example only, and other ways of achieving the same results are within the scope and spirit of the invention.

Step 1. User clicks on a site that has been bookmarked, such as "auction123.com", and the browser requests the auction123.com home page. (301)

The returned auction123.com home page (302) includes a JavaScript SRC=tag which tells the browser to fetch an auction123.com-served JavaScript file from auction123.com.partners.net.org as well as other JavaScript code that is used herein below. (303)

Step 2. The auction123.com server on partners.net.org gets a NET_BAA cookie and thus knows that a seamless global network login for such user is possible, i.e. if they have previously linked their auction123.com/global network accounts and opted into the auto-login feature. (303)

Step 3. The auction123.com server uses the baseline authentication agency domain from the NET_BAA cookie, aol.com.auth.net.org in this case, to formulate the URL to the BAA's login token-generation service, and returns an HTTP redirect to this URL. (304)

Step 4. The browser fetches aol.com's login token generation service URL, passing auction123.com's global network site id. (305)

Step 5. The BAA (aol.com) server receives the token-generation request including site id, as well as the user's NET credential cookies previously sent to the browser.

It checks to see if 1) the site id is known or valid; 2) the user's credentials are valid; and 3) the user has authorized seamless login to that site. Because all conditions are true in this case, it generates and returns a JavaScript snippet containing a short-lived, auction123.com specific, encrypted global network login token bound to a JavaScript variable, such as "netLoginTok". (306)

Step 6. The auction123.com's, original page served in Step 1 above, includes JavaScript that sees if the JavaScript variable, netLoginTok has a value. When the step fails, then netLoginTok has no value.

In the case netLoginTok has a value, then the auction123.com JavaScript code proceeds with the seamless global network login processing as follows:

The JavaScript code writes out an HTML form that includes the global network login token as a hidden field and the auction123.com global network login handler as the action (target URL). It then auto-submits the form such that the browser POSTS the form to the auction123.com global network login handler URL on auction123.com. (307)

Step 7. The auction123.com server requests mapping of login token->account number. (308)

The aol.com (BAA) server decrypts the login token and performs a series of validation checks on it, such as: not expired and if the IP of requesting auction123.com server is in allowed list for site id=auction123.com.

The validation checks pass and the aol.com server returns the user's global network account number to the auction123.com server. (309)

Step 8. The auction123.com server maps user's global network account number to their auction123.com record, and proceeds to log user in as usual, setting auction123.com cookies, etc., and returns a personalized welcome page. (310)

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. An apparatus for a baseline authentication agency for determining a user's login status as the user accesses a site within a network, said apparatus comprising:
   a database storing information about partner web sites that have been selected by a user for defining login parameters of the user associated with one or more of the partner web sites;
   a baseline authentication agency server for providing core global network authentication services configured:
      to receive a request from a user's browser, the request comprising: a site identification identifying a site; and
      a cookie related to the user and including:
         a reference to the baseline authentication agency; and
         an identifier distinguishing the baseline authentication agency which is associated with the user from a set of baseline authentication agencies;
      to determine whether the cookie is valid;
      to determine whether the user has authorized seamless login for the site using the information from the database; and
      to generate a login ticket for the site and send the login ticket to the user's browser if the cookie is valid and the user has authorized seamless login for the site;
      wherein the cookie is stored on a global network domain used for cookie sharing and the site is one of a collection of partner sites with access to cookies shared on the global network domain.

2. The apparatus of claim 1, wherein the baseline authentication agency provides authentication services for a subset of users of the global network domain, the baseline authentication agency server further configured to:
   after authenticating the user, write the site identification along with an authenticated status of true into the cookie of the user stored on the global network domain and shared and accessible by the collection of partner sites; and after the user logs out of said global network domain, reset the user's authenticated status to false in the cookie.

3. The apparatus of claim 1, wherein the baseline authentication agency server is further configured to:
   receive the ticket from the site;
   determine whether the ticket is valid; and
   if the ticket is valid, send user identification information to the site, the user identification information to be used by the site to login the user.

4. The apparatus of claim 1, wherein the baseline authentication agency server is further configured to:
   send a message to the user's browser that indicates that no ticket is available if the cookie is not valid or if the user has not authorized seamless login for the site.

5. The apparatus of claim 1, wherein the baseline authentication agency server further comprises:
   a globally unique identifier for each global network user account, wherein said globally unique identifier is a primary key with which the database is indexed.

6. A computer-implemented method for a baseline authentication agency that determines a user's login permission for a site, the method comprising:
   receiving a request from a user's browser, the request comprising a site identifier related to a site, and a cookie related to a user and including a reference designating the baseline authentication agency, the baseline authentication as one of a set of baseline authentication agencies and associated with the user;
   determining whether the cookie is valid;
   if the cookie is valid,
      determining whether the user has authorized seamless login for the site, the site selected by the user to establish the site as one of a group of partner sites for which the user has defined login parameters; and
   generating a login ticket for the site and sending the login ticket to the user's browser if the user has authorized seamless login for the site;
      wherein the cookie is stored on a global network domain used for cookie sharing and the site is one of a collection of partner sites with access to cookies shared on the global network domain.

7. The method of claim 6 further comprising:
   checking if the site identifier is known or valid.

8. The method of claim 6, further comprising:
   generating JavaScript code writing out an HTML form comprising the login ticket as a hidden field and writing out a partner Web site global network login handler as an action URL, and auto-submitting said form such that the browser posts the form to a partner Web site global network login handler URL on the partner site.

9. The method of method of claim 6, wherein the cookie includes a set of user information.

10. The method of claim 6, wherein the site is one of a collection of partner sites.

11. The method of claim 6, wherein generating the login ticket for the site comprises generating JavaScript code that stores the login ticket.

12. The method of claim 11, wherein sending the login ticket for the site comprises sending the JavaScript code.

13. The method of claim 6, further comprising:
   if the cookie is valid;
   receiving the ticket from the site;
   determining whether the ticket is valid; and
   if the ticket is valid, sending user identification information to the site, the user identification information to be used by the site to login the user.

14. A storage medium having a computer program stored thereon for causing a suitably programmed system to process computer-program code by performing the method of claim 6 when such program is executed on the system.

15. A baseline authentication agency associated with the user and configured to determine the user's login permission for a site, the baseline authentication agency comprising:
   a list of partner sites that have been selected by a user and include login parameters for the user associated with one or more of the sites;
   a baseline authentication agency server configured to:
   receive a request from a user's browser, the request comprising a site identifier related to a site, and a cookie related to a user and referencing the baseline authentication agency associated with the user;
   determine whether the cookie is valid;
   determine whether the user has authorized seamless login for the site; and
   if the cookie is valid and the user has authorized seamless login for the site,
      generate a login ticket for the site;
      send the login ticket to the user's browser;

wherein the cookie is stored on a global network domain used for cookie sharing and the site is one of a collection of partner sites with access to cookies shared on the global network domain.

16. The baseline authentication agency of claim 15, wherein the baseline authentication agency server is further configured to:

receive the ticket from the site;
determine whether the ticket is valid; and
if the ticket is valid, send user identification information to the site, the user identification information to be used by the site to login the user.

* * * * *